United States Patent [19]

Lonne et al.

[11] Patent Number: 4,554,084
[45] Date of Patent: Nov. 19, 1985

[54] SEALING RING

[75] Inventors: Klaus Lonne; Klaus-Peter Majewski, both of Burscheid, Fed. Rep. of Germany

[73] Assignee: Goetze AG, Burscheid, Fed. Rep. of Germany

[21] Appl. No.: 555,514

[22] Filed: Nov. 28, 1983

[30] Foreign Application Priority Data

Dec. 2, 1982 [DE] Fed. Rep. of Germany ....... 3244505

[51] Int. Cl.⁴ .............................................. C10M 7/02
[52] U.S. Cl. ................... 252/12.4; 252/12.6; 252/12.2; 277/DIG. 6; 277/96
[58] Field of Search ........................ 252/12, 12.2, 12.4, 252/12.6; 277/DIG. 6

[56] References Cited

U.S. PATENT DOCUMENTS 3,480,547  11/1969  Van Dyk ........................... 252/12.6
3,883,147  5/1975   Troy et al. ........................... 252/12
4,417,733  11/1983  Asher ............................ 277/DIG. 6

FOREIGN PATENT DOCUMENTS 1056439  4/1959  Fed. Rep. of Germany .
2458803  6/1976  Fed. Rep. of Germany .
2829333  5/1979  Fed. Rep. of Germany .
2845949  4/1980  Fed. Rep. of Germany .
3107920  5/1982  Fed. Rep. of Germany .

Primary Examiner—Jacqueline V. Howard
Attorney, Agent, or Firm—Spencer & Frank

[57] ABSTRACT

A sealing ring having at least one jacket face serving as slide face, the ring comprising pressed together fiber materials and slide materials, with the ring containing as a third component up to 10 parts by weight of such finely dispersed additives which chemically react with the fibers under the pressure and/or the development of heat resulting from friction stresses.

9 Claims, No Drawings

SEALING RING

BACKGROUND OF THE INVENTION

The present invention relates to a sealing ring having at least one jacket surface serving as slide surface, such as, in particular, a sealing ring for sealing articulatedly connected pipe ends subjected to high temperature stresses, preferably the exhaust pipes of internal-combustion engines where there are high temperature stresses, the sealing ring comprising pressed together fiber materials, preferably of metal and sliding agents.

For example, in exhaust systems of internal-combustion engines, it is known to articulatedly connect the pipe ends of the exhaust gas manifold and the exhaust gas outlet pipe by means of a pipe coupling system which operates according to the ball and socket principle so as to avoid the transfer of vibrations generated by the engine. The sealing ring placed between the pipe ends is adapted to the outlines of the ball or to the ball socket segments, respectively, and, during operation of the engine, is subjected to sliding and friction stresses which attack at least the jacket surface of the sealing ring.

Pursuant to this slide bearing function, such sealing rings, in a modern design, are composed of pressed together metal fiber materials on the basis of, usually, steel fibers and solid sliding materials, usually graphite. The embedded metal fiber body then forms the skeleton of the sealing ring which is saturated and coated with the sliding material.

Thus, according to DE-OS No. 2,829,333 the reinforcing fiber core is comprised of a suitably folded steel wire fabric which is wound in the circumferential direction of the ring. In this case, however, there exists the danger that the steel wires may break, particularly at the points where the wire fabric is folded, and the wire ends then penetrate the slide coatings covering them so that the wire ends contact the slide faces of the pipes. During stresses from engine operation, seizing phenomena and squeaking noises will then develop at these locations with ever increasing damage from wear and finally the connection becomes untight. To overcome this problem, DE-PS No. 2,845,949 employs individual, relatively long steel fibers arranged preferably in the circumferential direction, or, according to DE-OS No. 3,107,920, a reinforcing metal fiber skeleton of steel wool is used in which the steel fibers have irregular orientations.

In other cases, steel fibers of relatively short length and graphite powders are initially combined into the most homogeneous mixture possible, thus forming, with pressing, a sealing ring of a solid metal fiber felt, with solid lubricants embedded therein and coating the same. Although such measures substantially improve the sealing rings with respect to their susceptibility to wear, this is not the optimum solution for the above-described problem and damage from seizing continues to appear between metal and metal contact points during engine operation.

SUMMARY OF THE INVENTION

It is therefore an object of the present invention to provide an improved sealing ring having at least one jacket surface serving as a slide surface, with the sealing ring having good sliding characteristics without exhibiting the above-described wear phenomena.

Another object of the present invention is to provide such a sealing ring which is easy and economical to manufacture.

Additional objects and advantages of the present invention will be set forth in part in the description which follows and in part will be obvious from the description or can be learned by practice of the invention. The objects and advantages are achieved by means of the products, instrumentalities and combinations particularly pointed out in the appended claims.

To achieve the foregoing objects and in accordance with its purpose, the present invention provides a sealing ring having at least one jacket surface serving as a slide surface, and containing pressed together fiber and slide material components, and a third component in the form of at least one finely dispersed organic and/or inorganic additive which reacts with the fibers under the pressure and/or heat developed during frictional stresses.

Preferably, the sealing ring contains up to 10 parts (percent) by weight of such additives which, during manufacture of the sealing ring, are preferably first mixed with the sliding material and then pressed together with the fibers, which are preferably metal fibers.

The additives preferably are present in an amount of at least about 0.25 percent by weight and up to 10 percent by weight of the sealing ring.

At the points where the fiber components come in contact with one another during engine operation while developing much heat, the fiber components react with the additive to form surface coatings or chemically polish the fibers so that seizing phenomena and the resulting wear and untightness of the slide faces are effectively prevented.

Preferably, the sealing ring is for sealing articulatedly joined pipe ends in the exhaust system of an internal combustion engine.

It is to be understood that both the foregoing general description and the following detailed description are exemplary and explanatory, but are not restrictive of the invention.

DETAILED DESCRIPTION OF THE PRESENT INVENTION

The additives which are employed in the present invention are additives which per se are known from DE-OS No. 2,458,803 as additives which are to be added to lubricants. The additives are preferably chlorides, sulfates, carbonates, borates or phosphates of the alkali metals, silicate or phosphate glasses, thiocompounds, preferably in the form of thiosulfates, such as sodium thiosulfate, or dithiophosphates, as well as organic chlorine, sulfur, phosphorus and arsenic complexes. Boron carbide ($B_4C$) and potassium borofluoride as well as boron containing substances can also be used as preferred additives.

However, according to DE-OS No. 2,458,803, these substances are added to the lubricants in the form of solutions, emulsions, suspensions or mixtures, so that during engine operation these substances can become active between the slide faces of the friction partners and have a corresponding influence on the slide faces.

According to the present invention, however, the additives are pressed together with the slide materials and the metal fibers and are present in the sealing ring in homogeneous distribution in the slide material. It has been found in engine test runs that sealing rings of pressed together solid slide materials and metal fibers exhibit no seizing phenomena nor the squeaking noises connected therewith and do not become untight, regardless of which slide materials are used and whether the metal fibers are present in the form of a folded and wound inserted metal wire fabric, in the form of metal fibers embedded in the circumferential direction, in the form of embedded metal fiber wool or in the form of a fiber felt made of relatively short metal fibers. It appears that evidently the additives react with the metal fibers and form surface coating or layers or chemically polish the metal fibers only at those places where the metal fibers come in contact with the counterslide faces while much heat is developed and there is the influence of pressure. In the interior of the sealing ring, the additives remain unchanged and form a reservoir for use when the sealing ring wears down.

By using the additives according to the present invention, which are present in the sealing ring between the slide materials and the metal fibers in a finely dispersed state, a sealing ring has thus been provided which is easily and economically manufactured, in which the above-described drawbacks of seizing and squeaking noises with resulting wear and untightness are avoided.

While the present invention is to be used preferably for sealing rings including embedded metal fibers, it is also possible, within the scope of the present invention, to use instead of metal fibers, such metal fibers in a mixture with other fibers of organic or inorganic origin. Moreover, in the practice of the present invention, organic or inorganic fibers can also be used alone or in mixture instead of the metal fibers, then but the additives must be adapted to the types of fibers employed.

The fibers which are employed with preference in the practice of the present invention are metal fibers or metal wires. In principle, however, it is also possible to use inorganic fibers or heat resistant synthetic organic fibers or a mixture of the various types of fibers.

The preferred metal fibers, due primarily to their corrosion resistance, are high-grade steel fibers. In principle, however, fibers of unalloyed steel, weakly alloyed steel, copper, aluminum, bronze or brass can also be used, individually or in mixture. The term "individually or in mixture" as used throughout the specification indicates that only one type of the recited components or a mixture of the recited components can be employed.

The preferred inorganic fibers are ceramic fibers, glass wool fibers, slag wool fibers or rock wool fibers, individually or in mixture. The heat resistant synthetic organic fibers are preferably polyamide, polyaramid, polyimide, or polyfluorocarbon fibers, individually or in mixture.

The sliding agents employed are preferably the known solid lubricants in powder or flake form, such as primarily graphite, boron nitride, calcium fluoride, slide metals, molybdenum disulfide or mica, individually or in mixture.

Depending on the case of use, the fiber/sliding agent mixtures can comprise 10 to 90 parts by weight fibers and 10 to 90 parts by weight sliding agents.

The sealing ring according to the present invention preferably includes a uniform distribution, over its cross section, of fiber components, sliding agents and additives. The fiber components form a firm fiber sheet and are uniformly surrounded by the sliding agents and additives. To manufacture such rings, the mixtures are first produced of the individual components, these mixtures are then put into an appropriate mold, and are pressed into the desired shape by a correspondingly high pressure of usually up to 200 ton. For example, the mixtures can be subjected, after being loosely filled into the mold, primarily to vibrations, rotations and/or magnetic forces, so that the final mixtures appear in the mold with the desired uniform distribution of the individual components.

It will be understood that the above description of the present invention is susceptible to various modifications, changes and adaptations, and the same are intended to be comprehended within the meaning and range of equivalents of the appended claims.

What is claimed is:

1. Sealing ring having at least one jacket face which serves as slide face, the ring comprising pressed together fibers and slide material, with the fibers being pressed together with the slide material, and containing at least one additive which reacts chemically with the fibers under the pressure and/or the development of heat resulting from friction stresses, said additive being selected from the group of compounds consisting of chlorides, sulfates, carbonates, borates and phosphates of alkali metals; silicate and phosphate glasses; thio compounds; organic complexes of chlorine, sulfur, phosphorus and arsenic; boron carbide; potassium borofluoride; and other boron containing substances, whereby said additives form surface coatings or chemically polish said fibers; said additives and slide materials being evenly distributed throughout the fibers.

2. Sealing ring as defined in claim 1, wherein the sealing ring contains from 0.25 to 10 percent by weight of the additive.

3. Sealing ring as defined in claim 1, wherein the additive is finely dispersed in the slide material.

4. Sealing ring as defined in claim 1, wherein the additive is at least one component selected from chlorides, sulfides, carbonates, borates and phosphates of the alkali metals.

5. Sealing ring as defined in claim 1, wherein the additive is at least one component selected from silicate glass powders and phosphate glass powders.

6. Sealing ring as defined in claim 1, wherein the additive is at least one thiocompound selected from thiosulfates and dithiophosphates.

7. Sealing ring as defined in claim 1, wherein the additive is at least one complex selected from organic chlorine, sulfur, phosphorus and arsenic complexes.

8. Sealing ring as defined in claim 1, wherein the additive is at least boron containing material selected from boron carbide ($B_4C$) and potassium borofluoride ($KBF_4$).

9. Sealing ring as defined in claim 1, wherein the fibers comprise metal fibers.

* * * * *